Figure 1:
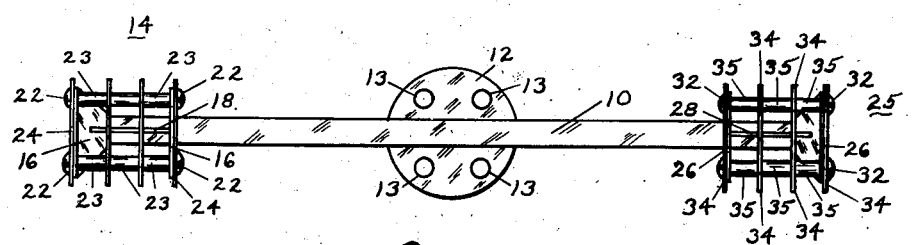

Aug. 25, 1953  H. K. HECKER  2,649,933
LIFTING DEVICE
Filed June 18, 1949

INVENTOR
Harvard K. Hecker
BY
Ray Eilers
ATTORNEY

Patented Aug. 25, 1953

2,649,933

UNITED STATES PATENT OFFICE 2,649,933

LIFTING DEVICE

Harvard Kaufmann Hecker, University City, Mo., assignor to Curtis Manufacturing Company, St. Louis, Mo., a corporation of Missouri Application June 18, 1949, Serial No. 100,017

4 Claims. (Cl. 187—8.74)

This invention relates to improvements in lifting devices. More particularly, this invention relates to improvements in chocks which, when used with lifting devices, can engage and support automotive vehicles.

It is therefore an object of the present invention to provide an improved chock, which when used with lifting devices, can engage and support automotive vehicles.

Lifting devices have been used to raise automotive vehicles for inspection, service, or repair; and those lifting devices have usually been provided with vertically-directed plungers that raise and lower vehicle-engaging superstructures. In some instances those superstructures had the form of yokes which were equipped with broad, flat vehicle-engaging pads. In other instances, those superstructures had the form of bars which carried movable chocks. The broad, flat pads were not completely satisfactory because they merely underlaid the chassis of the vehicle and did not positively hold that vehicle against shifting. As a result, users of lifting devices equipped with broad, flat pads had to use considerable care in working with the vehicles supported by those pads. Movable chocks are more desirable than the broad, flat pads; but the need of shifting the chocks into registry with particular portions of the chassis of each vehicle, and the cost of making those chocks detract from their value. The present invention provides fixed chocks that positively hold vehicles against shifting, and yet are simple and inexpensive to construct.

Each of the chocks provided by the present invention has a plurality of plates that are spaced apart, and the chocks are themselves spaced apart; thus the chocks are able to support spaced portions of the chassis of the vehicles. The plates of the chocks are generally vertically-directed, and they provide individual contact with spaced portions of the chassis of the automotive vehicles. In that way, the chocks concentrate the supporting forces on small areas, thereby holding the automotive chassis against shifting relative to the chocks. It is therefore an object of the present invention to provide chocks, for lifting devices, which have a number of vertically-directed, spaced plates to engage spaced portions of the chassis of an automotive vehicle.

The upper edges of the plates of the chocks, provided by the present invention, are serrated. The serrations in the upper edges of the plates positively prevent slipping of the automotive vehicles relative to the chocks. The serrations do this by extending upwardly on both sides of downwardly depending portions of the vehicle chassis, or by concentrating the weight of the chassis on such a small number of points that the frictional forces between chassis and chock are sufficient to prevent shifting of the chassis. This is very desirable since it assures safe handling of the vehicle during inspection, maintenance, or repair. It is therefore an object of the present invention to provide chocks with a plurality of plates that have serrate upper edges.

The upper ends of the serrations on the plates of the chocks are not sharply pointed, instead they are flattened slightly. As a result, the plates will not cut or mar the undersurface of the chassis of the vehicle. However, the total area of the upper ends of the serrations is so small that the frictional forces between chassis and chock is sufficient to resist shifting of the chassis.

The individual plates of the chocks provided by the present invention are preferably made of a resilient material. Where that is done, the material of which the plates are made can yield somewhat and can absorb some of the dynamic forces which are created in the automotive vehicle during inspection, maintenance or repair. For example, if the automotive vehicle were to be shaken during greasing, to facilitate full penetration of the joints by the fresh grease, dynamic forces would be created in the vehicle; and those forces could be at least partially absorbed by the resilience of the plates. Consequently the vehicle can tend to remain fixedly in contact with the chocks as the plates bend, rather than shift and slide relative to those chocks. The amount of bending will be quite limited, but that bending will be of material benefit. The resilience of the blades thus minimizes the risk of the vehicle falling from the lifting device. It is therefore an object of the present invention to provide a chock which has a number of plates which are made of resilient material.

The plates of the chocks provided by the present invention are "stepped" so the plates closest to the center of the superstructure are highest and so the plates outermost from the superstructure are the lowest. This disposition of the plates is desirable because it enables many of the plates to engage the chassis. This is important where the wheel-supporting mechanism of the vehicle inclines downwardly and outwardly from the center line of the vehicle. It is therefore an object of the present invention to provide chocks with a number of individual plates that are "stepped" so many of the plates can engage the chassis.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
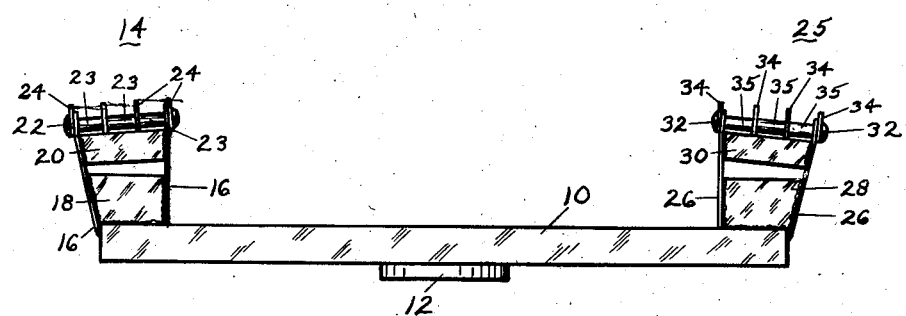
Figure 3:
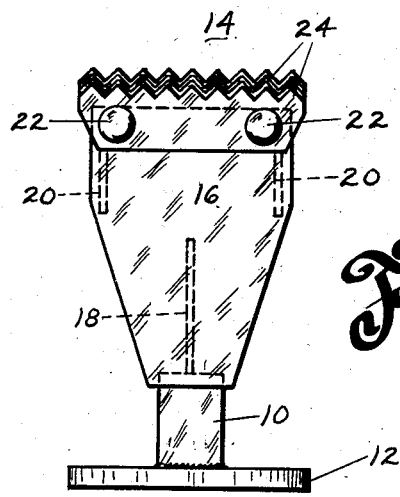

In the drawing Fig. 1 is a plan view of a supporting bar that is equipped with chocks made in accordance with the principles and teachings of the present invention, Fig. 2 is a side elevational view of the supporting bar and chocks of Fig. 1, and Fig. 3 is a large scale and elevational view of the supporting bar and chocks of Figs. 1 and 2.

Referring to the drawing in detail, the numeral 10 denotes a horizontally-disposed supporting bar. This bar has a flat plate 12 secured to the bottom thereof, as by welding or other suitable means; and that plate can be releasably secured to the top of the plunger of a lifting device. Four holes 13 are provided in the plate 12, and bolts or screws can be passed through those openings and seated in the top of the plunger of the lifting device.

The numeral 14 generally denotes a chock located at the left hand end of the supporting bar 10, and that chock has two hexagonal plates 16. The plates 16 are preferably secured to the supporting bar 10 by welding; and the outermost plate 16 is welded to the bar 10 in such a way that the upper end of that plate is below the upper end of the innermost plate 16. This is easily accomplished by disposing the lower end of the outermost plate 16 below the upper edge of the supporting bar 10 and by welding that end to the end of that bar, while resting the lower end of the innermost plate 16 on the top of the bar 10 and welding it to that bar. Precise positioning of the plates 16 relative to the bar 10 can easily be attained by use of a welding jig or fixture. Setting the plates 16 in this manner enables the tops of those plates to define a plane which inclines outwardly and downwardly, while permitting the plates 16 to be identical in form and shape. This effects a reduction in manufacturing costs.

A vertically-directed web 18 extends between and is welded to each of the plates 16, and that web is also welded to the top of the bar 10. This web stiffens the plates 16 while spacing them apart, and it also strengthens the securement of the chock 14 to the supporting bar 10. Additional webs 20 are welded to each of the plates 16, and those webs are displaced vertically above the web 18 while being displaced horizontally outwardly from that web. The webs 20 underlie plates 24; plates 24 being mounted on rods 22 which extend between plates 16, and being spaced apart by sleeves 23. These plates will extend longitudinally of the vehicle they engage and support. The outermost and the innermost plates 24 are clamped solidly against the outermost and innermost plates 16, and the center plates 24 are fixedly spaced by the sleeves 23. The fit between the rods 22, plates 24, and sleeves 23 is made quite tight so the plates 24 will not shift their positions relative to each other or relative to bar 10. The innermost plate 24 will be the highest relative to bar 10, and the outermost plate 24 will be the lowest relative to the bar 10, and the other two plates 24 will be "stepped" between the innermost and outermost plates 24. This "stepped" arrangement is due solely to the positioning of the plates 16; the plates 24 all being identical. The upper edges of the plates 24 are serrated, and the serrations will grip the chassis of the vehicle, as by having two of the teeth extend upwardly on opposite sides of a downwardly depending portion of the vehicle chassis, or by concentrating the weight of the chassis on such a small number of points that the frictional forces between chassis and chock prevent shifting of the chassis. The upper ends of the serrations are not sharply pointed; instead, those upper ends are flattened. By extending upwardly on opposite sides of portions of the vehicle chassis, or by concentrating the forces in a small number of points, the serrated edges provide a positive check against shifting of the vehicle relative to the lifting device.

The material of which the plates 24 are made is preferably a hard metal with considerable resiliency. One such metal is heat-treated, high carbon steel; and when made from such a material, the plates 24 will be able to flex as dynamic loads are applied to the vehicles on the lifting device. The plates will seem quite stiff to the touch, but they will flex under dynamic loads. That flexing will at least partially absorb those loads and will thus minimize the tendency of the vehicle to slide relative to the plates 24.

A chock is provided at the right hand end of the supporting bar 10, and that chock is generally denoted by the numeral 25. Chock 25 has plates 26 similar to the plates 16, and those plates are welded to the bar 10 in much the same manner as the plates 16 of chock 14 are welded to bar 10. The plates 26 are stiffened and spaced apart by a vertically-directed web 28 similar to the web 18 of chock 14. Web 28 is welded to the plates 26 and to the bar 10. Additional webs 30 are provided between the plates 26, and those webs are vertically-directed but are displaced horizontally outwardly from the web 28.

Four plates 34 are disposed above the webs 30, and those plates are similar to the plates 24 of chock 14. The plates 34 are secured to the plates 26 by the rods 32, and the plates 34 are spaced apart by sleeves 35. The upper edges of the plates 34 define a plane that inclines outwardly and downwardly, and those upper edges are serrated. The serrate upper edges of plates 34 will engage and hold portions of the chassis of the vehicle.

The corresponding plates 24 and 34 of chocks 14 and 25 are spaced apart so each pair of plates can engage and support a different portion of the chassis of the vehicle. The effect of such an arrangement is to enable the chocks 14 and 25 to engage and support a number of different portions of the vehicle chassis and to engage and support vehicles with many different kinds, styles, and shapes of chassis.

The number of individually different parts in the chocks 14 and 25 is quite small, being only six in number. This small number of parts minimizes the cost and technique of manufacture. By welding these various parts together, the present invention attains an extremely sturdy structure that is light in weight but strong enough to support heavy vehicles.

Whereas a preferred embodiment of the present invention has been shown and described in the drawing and accompanying description it should be obvious to those skilled in the art that various changes may be made in the form of the invention without affecting the scope thereof.

What I claim is:

1. A lifting device for vehicles of different styles and shapes that comprises a support adapted to be raised and lowered and a plurality of vehicle-engaging elements carried by said support, said vehicle-engaging elements being grouped together in groups to form a plurality of vehicle-engaging chocks, said chocks being disposed at opposite ends of said support, said vehicle-engaging elements of each chock having vehicle-engaging surfaces thereon which are spaced apart horizontally, the vehicle-engaging elements in each said group having upper edges that are spaced vertically apart from the upper edges of adjacent vehicle-engaging elements in said group, said horizontal spacing of said vehicle-engaging elements and said vertical spacing of the upper edges of said vehicle-engaging elements causing said group of vehicle-engaging elements to define planes inclined downwardly and outwardly, said vehicle-engaging elements being plates of resilient metal, the upper edges of said vehicle-engaging elements being serrated.

2. A lifting device for vehicles of different styles and shapes that comprises a support adapted to be raised and lowered and a plurality of vehicle-engaging elements carried by said support, said vehicle-engaging elements being grouped together in groups to form a plurality of vehicle-engaging chocks, said groups of vehicle-engaging elements being disposed at opposite ends of said support, said vehicle-engaging elements of each chock having vehicle-engaging surfaces thereon which are spaced apart horizontally, the vehicle-engaging elements in each said group having upper edges that are spaced vertically apart from the upper edges of adjacent vehicle-engaging elements in said group, said horizontal spacing of said vehicle-engaging elements and said vertical spacing of the upper edges of said vehicle-engaging elements causing said group of vehicle-engaging elements to define planes inclined downwardly and outwardly, said vehicle-engaging elements in each chock being metal plates that are held in predetermined relation by spacers.

3. A lifting device for vehicles of different styles and shapes that comprises a support adapted to be raised and lowered and a plurality of vehicle-engaging elements carried by said support, said vehicle-engaging elements being grouped together in groups to form a plurality of vehicle-engaging chocks, said vehicle-engaging elements of each chock having vehicle-engaging surfaces thereon which are spaced apart horizontally, the vehicle-engaging elements in each said group having upper edges that are spaced vertically apart from the upper edges of adjacent vehicle-engaging elements in said group, said horizontal spacing of said vehicle-engaging elements and said vertical spacing of the upper edges of said vehicle-engaging elements causing said group of vehicle-engaging elements to define planes inclined downwardly and outwardly, the upper edges of said vehicle-engaging elements being serrated.

4. A lifting device for vehicles of different styles and shapes that comprises a support adapted to be raised and lowered and a plurality of vehicle-engaging elements carried by said support, said vehicle-engaging elements being grouped together in groups to form a plurality of vehicle-engaging chocks, said vehicle-engaging elements of each chock having vehicle-engaging surfaces thereon which are spaced apart horizontally, the vehicle-engaging elements in each said group having upper edges that are spaced vertically apart from the upper edges of adjacent vehicle-engaging elements in said group, said horizontal spacing of said vehicle-engaging elements and said vertical spacing of the upper edges of said vehicle-engaging elements causing said group of vehicle-engaging elements to define planes inclined downwardly and outwardly.

HARVARD KAUFMANN HECKER.

References Cited in the file of this patent

UNITED STATES PATENTS

| Number | Name | Date |
|---|---|---|
| 1,978,471 | Mizer et al. | Oct. 30, 1934 |
| 2,012,430 | Kuhlman | Aug. 27, 1935 |
| 2,045,173 | Baird | June 23, 1936 |
| 2,158,399 | Carter | May 16, 1939 |
| 2,508,777 | Smith | May 23, 1950 |